Figure 1:
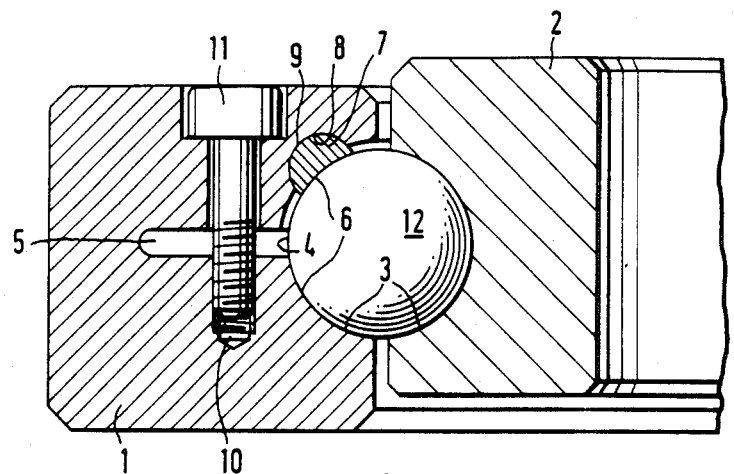

United States Patent [19]

Kaiser

[11] Patent Number: 4,707,151

[45] Date of Patent: Nov. 17, 1987

[54] RADIAL ROLLING BEARINGS

[75] Inventor: Theodor Kaiser, Hochstadt, Fed. Rep. of Germany

[73] Assignee: INA Walzlager Schaeffler KG, Fed. Rep. of Germany

[21] Appl. No.: 44,991

[22] Filed: Apr. 30, 1987

[30] Foreign Application Priority Data

May 14, 1986 [DE] Fed. Rep. of Germany ....... 3616244

[51] Int. Cl.⁴ .......................... F16C 33/60; F16C 33/61
[52] U.S. Cl. ..................................... 384/495; 384/500; 384/505; 384/513; 384/519; 384/558; 384/569; 384/583
[58] Field of Search ............... 384/495, 500, 505, 519, 384/501, 558, 569, 583, 535, 615, 622

[56] References Cited

U.S. PATENT DOCUMENTS 1,195,952 8/1916 Fox ........................................ 384/505
2,927,826 3/1960 Weed .................................... 384/500
3,081,135 3/1963 Olson .................................... 384/501
3,517,975 6/1970 Lonngren et al. ................... 384/622

Primary Examiner—Lenard A. Footland
Attorney, Agent, or Firm—Bierman & Muserlian

[57] ABSTRACT

Radial rolling bearing with adjustable clearance comprising two concentric races whose outer facing surface areas are provided with a groove, the grooves defining the raceway for the rolling elements, a slot is provided in the area of the center plane of the rolling bearing extending radially from the bottom of one of the grooves over only a portion of the race depth so that the slotted race has a partial raceway at both sides of the slot wherein the slot width is changeable by means acting on the race and causing a deformation of the race, characterized in that at least one partial track (6) is defined by a race wire (7) which is provided with rounded back (8) at the one side facing the race (1) and is swingably mounted relative to the race (1) in a circumferential groove (9) of the latter.

2 Claims, 2 Drawing Figures

RADIAL ROLLING BEARINGS

STATE OF THE ART

Radial rolling bearings with adjustable clearance comprising two concentric races whose outer facing surface areas are each provided with a groove, the grooves defining the raceway for the rolling elements, a slot provided in the area of the center plane of the rolling bearing extending radially from the bottom of one of the grooves over only a part of the race depth so that the slotted race has a partial raceway at both sides of the slot wherein the slot width is changeable by means acting on the race and causing a deformation of the race are known. A drawback of these designs resides in the deviation of the contour of the tracks from the contour of the rolling elements after deformation of the slotted race so that strains are encountered between the rolling elements and the tracks (DE-OS No. 23 47 052).

OBJECTS OF THE INVENTION

It is an object of the invention to compensate for variations in the contour of the track caused during the adjustment of the clearance to guarantee optimal rolling conditions for the rolling elements.

This and other objects and advantages of the invention will become obvious from the following detailed description.

THE INVENTION

The radial rolling bearings of the invention with adjustable clearance are comprised of two concentric races whose outer facing surface areas are each provided with a groove, the grooves defining the raceway for the rolling elements, a slot is provided in the area of the center plane of the rolling bearing extending radially from the bottom of one of the grooves over only a portion of the race depth so that the slotted race has a partial raceway at both sides of the slot wherein the slot width is changeable by means acting on the race and causing a deformation of the race, characterized in that at least one partial track (6) is defined by a race wire (7) which is provided with rounded back (8) at the one side facing the race (1) and is swingably mounted relative to the race (1) in a circumferential groove (9) of the latter. Since the running surface of the race wire is constantly in contact with the rolling elements during deformation of the race and is pivoted with its rounded back relative to the race, optimal rolling conditions are guaranteed also after the deformation of the race.

According to an embodiment of the invention, the deformation is caused by tightening screws which are arranged in axial bores in the area of the slot. Through this simple and suitable construction, the structural space for the deformation means is kept at a minimum.

REFERRING NOW TO THE DRAWINGS

Figure 2:
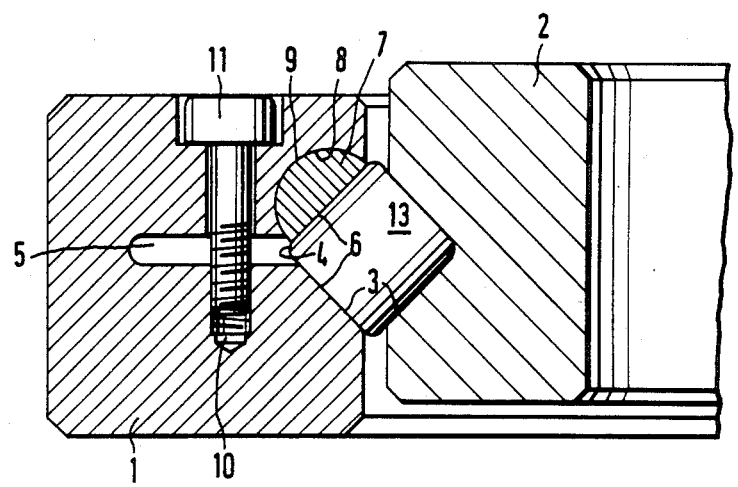

FIG. 1 is a longitudinal cross-section of a radial ball bearing of the invention and FIG. 2 is a longitudinal cross-section of an angular roller bearing of the invention.

In FIG. 1, the radial ball bearing is illustrated comprising an outer race 1 and concentric thereto an inner race 2. At their outer surface areas facing each other, the inner race 1 and outer race 2 are each provided with a groove 3 and arranged within the race 1 is a slot 5 which extends radially from the bottom 4 of the groove 3 in race 1. Thus, race 1 is provided at each side of the slot 5 with a partial track 6 and one of the partial tracks 6 is defined by a race wire 7 which has a rounded back 8 and is accommodated in a circumferential groove 9 of the race 1. The race wire 7 is swingably mounted relative to the race 1. Tightening screws 11 are arranged in axial bores 10 to narrow the slot 5 and thus the obtained deformation of race 1 causes a pivoting of the race wire 7 relative to race 1 so as to maintain optimal rolling conditions for the ball 12 rolling between races 1 and 2.

The angular roller bearing illustrated in FIG. 2 is essentially of the same design as the radial ball bearing as shown in FIG. 1 with the only difference being in the use of rollers 13 as rolling elements instead of balls 12.

Various other modifications of the bearings of the invention may be made without departing from the spirit or scope thereof and it is to be understood that the invention is intended to be limited only as defined in the appended claims.

What is claimed is:

1. Radial rolling bearing with adjustable clearance comprising two concentric races whose outer facing surface areas are each provided with a groove, the grooves defining the raceway for the rolling elements, a slot is provided in the area of the center plane of the rolling bearing extending radially from the bottom of one of the grooves over only a portion of the race depth so that the slotted race has a partial raceway at both sides of the slot wherein the slot width is changeable by means acting on the race and causing a deformation of the race, characterized in that at least one partial raceway (6) is defined by a race wire (7) which is provided with rounded back (8) at the one side facing the race (1) and is swingably mounted relative to the race (1) in a circumferential groove (9) of the latter.

2. A rolling bearing of claim 1, wherein the deformation is caused by tightening screws (11) arranged in axial bores (10) in the area of the slot (5).

* * * * *